(12) United States Patent
Leighton

(10) Patent No.: US 8,079,696 B2
(45) Date of Patent: Dec. 20, 2011

(54) SOLID INK PASTILLES

(75) Inventor: Roger Leighton, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/507,958

(22) Filed: Jul. 23, 2009

(65) Prior Publication Data

US 2009/0308280 A1    Dec. 17, 2009

Related U.S. Application Data

(62) Division of application No. 11/095,174, filed on Mar. 31, 2005, now Pat. No. 7,604,336.

(51) Int. Cl.
*C09D 11/00* (2006.01)
(52) U.S. Cl. .......... 347/100; 347/99; 347/88; 106/31.13
(58) Field of Classification Search ............. 347/100, 347/88, 99; 106/31.13
See application file for complete search history.

(56) References Cited

U.S. PATENT DOCUMENTS

| | | | |
|---|---|---|---|
| 4,636,803 A | | 1/1987 | Mikalsen |
| 4,682,187 A | | 7/1987 | Martner |
| 4,723,135 A | * | 2/1988 | Yano et al. .............. 347/20 |
| 4,739,339 A | | 4/1988 | DeYoung et al. |
| 4,971,408 A | | 11/1990 | Hoisington et al. |
| 5,013,498 A | | 5/1991 | Froeschke |
| 5,038,157 A | | 8/1991 | Howard |
| 5,372,852 A | | 12/1994 | Titterington et al. |
| 5,378,132 A | | 1/1995 | Kaiser |
| 5,537,189 A | | 7/1996 | Imes |
| 5,633,005 A | | 5/1997 | Imer |
| 6,053,608 A | | 4/2000 | Ishii et al. |
| 6,066,200 A | | 5/2000 | Breton et al. |
| 6,096,125 A | * | 8/2000 | Breton et al. .............. 106/31.43 |
| 6,319,310 B1 | | 11/2001 | Wong et al. |
| D453,787 S | | 2/2002 | Mattern |
| 6,511,149 B1 | | 1/2003 | Peeters et al. |
| 2002/0003563 A1 | | 1/2002 | Hollands et al. |
| 2003/0035039 A1 | | 2/2003 | Kanome et al. |
| 2003/0100633 A1 | | 5/2003 | Maki et al. |
| 2003/0222951 A1 | | 12/2003 | Jones |

OTHER PUBLICATIONS

Extended EP Search Report, Europeans Patent Office, Munich, Germany, Apr. 27, 2006, 5 pages.
Communication Persuant to Article 94(3) EPC, European Patent Office, Munich, Germany, Mar. 5, 2009, 3 pages.
Martin, Laura E.; Non-Final Office Action for U.S. Appl. No. 12/121,003; Mailed Aug. 4, 2010 (8 pages).
Lockman, David M.; Amendment in Response to Non-Final Office Action for U.S. Appl. No. 12/121,003; Submitted Oct. 8, 2010 (8 pages).
Martin, Laura E.; Final Office Action for U.S. Appl. No. 12/121,003; Mailed Dec. 20, 2010 (9 pages).

(Continued)

*Primary Examiner* — Laura Martin
(74) *Attorney, Agent, or Firm* — Maginot, Moore & Beck, LLP

(57) ABSTRACT

A particulate composition of solid phase change ink includes sub-granular size pastilles composed of at least a salt, an ink vehicle compound, a viscosity modifying amide compound and a colorant, and each sub-granular size pastille of the particulate composition is at most the size of very coarse sand, and has a diameter of at most 2 mm on the Wentworth-Udden particle-sizing scale for increasing a melting rate thereof at a melting temperature of the solid phase change ink.

3 Claims, 6 Drawing Sheets

OTHER PUBLICATIONS

Lockman, David M.; Amendment Accompanying Request for Continued Examination for U.S. Appl. No. 12/121,003; Submitted Mar. 21, 2011 (13 pages).

Martin, Laura E.; First Non-Final Office Action for U.S. Appl. No. 11/095,174; Mailed Aug. 28, 2007 (8 pages).

Nguti, Tallam I.; Amendment in Response to First Non-Final Office Action for U.S. Appl. No. 11/095,174; Submitted Nov. 27, 2007 (12 pages).

Martin, Laura E.; Second Non-Final Office Action for U.S. Appl. No. 11/095,174; Mailed Jan. 14, 2008 (8 pages).

Nguti, Tallam I.; Amendment in Response to Second Non-Final Office Action for U.S. Appl. No. 11/095,174; Submitted Jun. 12, 2008 (17 pages).

Martin, Laura E.; Final Office Action for U.S. Appl. No. 11/095,174; Mailed Jul. 31, 2008 (9 pages).

Nguti, Tallam I.; Appeal Brief for U.S. Appl. No. 11/095,174; Submitted Dec. 9, 2008 (32 pages).

Martin, Laura E.; Non-Final Office Action for U.S. Appl. No. 11/094,857; Mailed Sep. 26, 2007 (7 pages).

Nguti, Tallam I.; Amendment in Response to Non-Final Office Action for U.S. Appl. No. 11/094,857; Submitted Dec. 20, 2007 (10 pages).

* cited by examiner

WENTWORTH - UDDEN PARTICLE - SIZING SCALE

| MILLIMETERS (mm) | MICROMETERS (μm) | Phi(Φ) | WENTWORTH SIZE CLASS | | ROCK TYPE |
|---|---|---|---|---|---|
| 4096 | | -12.0 | BOULDER | GRAVEL | CONGLOMERATE/ BRECCIA |
| 256 | | -8.0 | COBBLE | | |
| 64 | | -6.0 | PEBBLE | | |
| 4 | | -2.0 | GRANULE | | |
| 2.00 | | -1.0 | VERY COURSE SAND | SAND | SANDSTONE |
| 1.00 | | 0.0 | COARSE SAND | | |
| 1/2  0.50 | 500 | 1.0 | MEDIUM SAND | | |
| 1/4  0.25 | 250 | 2.0 | FINE SAND | | |
| 1/8  0.125 | 125 | 3.0 | VERY FINE SAND | | |
| 1/16  0.0625 | 63 | 4.0 | COARSE SILT | SILT | SILTSTONE |
| 1/32  0.031 | 31 | 5.0 | MEDIUM SILT | | |
| 1/64  0.0156 | 15.6 | 6.0 | FINE SILT | | |
| 1/128  0.0078 | 7.8 | 7.0 | VERY FINE SILT | | |
| 1/256  0.0039 | 3.9 | 8.0 | CLAY | MUD | CLAYSTONE |
| 0.00006 | 0.06 | 14.0 | | | |

FIG. 8

SOLID INK PASTILLES

CLAIM OF PRIORITY AND RELATED APPLICATIONS

This application claims priority from U.S. application Ser. No. 11/095,174, which was filed on Mar. 31, 2005 and entitled "Solid Ink Pastilles." This application is also related to U.S. application Ser. No. 12/121,003 entitled "HIGH-SPEED PHASE CHANGE INK IMAGE PRODUCING MACHINE INCLUDING A STATIC ELIMINATING SOLID INK CONTAINER," which was filed on May 15, 2008 and which is a divisional application of U.S. application Ser. No. 11/094,857 entitled "STATIC ELIMINATING SOLID INK CONTAINER," which was filed on Mar. 31, 2005, and issued as U.S. Pat. No. 7,380,928 on Jun. 3, 2008, all of which have at least one common inventor and are hereby expressly incorporated by reference.

BACKGROUND

This invention relates generally to solid ink forms, and more particularly to solid ink pastilles for use in high-speed solid ink jet printers.

In general, phase change ink image producing machines or printers employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1994 to Titterington et al. As disclosed therein, the phase change ink printing process includes raising the temperature of a solid form of the phase change ink so as to melt it and form a molten liquid phase change ink. It also includes applying droplets of the phase change ink in a liquid form onto an imaging surface in a pattern using a device such as an ink jet printhead. The process then includes solidifying the phase change ink droplets on the imaging surface, transferring them the image receiving substrate, and fixing the phase change ink to the substrate.

As is well known in the art, phase change inks used in such machines are waxy, melt at less than about 120.degree. C., and therefore are very different from dry powder toners that are used in xerographic machines. Examples of such phase change inks are disclosed in the following references. U.S. Pat. No. 6,319,310 issued Nov. 20, 2001 and entitled "Phase Change Ink Compositions" discloses a phase change ink comprising (a) a carbamate or thiourea, said carbamate or thiourea having a melting point of no higher than about 120.degree. C. and an acoustic loss value of no more than about 100 decibels per millimeter, (b) a colorant, (c) a branched hydrocarbon with a number average molecular weight of no more than about 10,000 and a melting point or softening point of no more than about 120.degree. C., (d) an optional plasticizer, (e) an optional alcohol having a melting point of less than about 90.degree. C. and an acoustic loss value of no more than about 100 decibels per millimeter, (f) an optional lightfastness-imparting agent, and (g) an optional antioxidant.

U.S. Pat. No. 6,096,125 issued Aug. 1, 2000 and entitled "Ink Compositions" discloses an ink composition comprised of (1) a mixture comprised of a salt and an oxyalkylene compound wherein the conductive mixture possesses a melting point of from about 60.degree. C. to about 120.degree. C.; (2) an ink vehicle compound with a melting point of from about 80.degree. C. to about 100.degree. C.; (3) a viscosity modifying amide compound; (4) a lightfastness component; (5) a lightfastness antioxidant; and (6) a colorant.

Conventionally, the solid form of such solid or phase change inks is a "stick", "block", "bar" or "pellet" as disclosed for example in U.S. Pat. No. 4,636,803 as illustrated in FIG. 4 as a bullet shaped or cylindrical pellet 424 that is engaged at its rear side by a turn in a helix 442. In U.S. Pat. No. 4,739,339 the solid ink is shown as a cylindrical block; in U.S. Pat. No. 5,038,157 as a hexagonal bar; and in U.S. Pat. No. 6,053,608, as illustrated in FIG. 3, it is shown as a tapered block 300 with a stepped configuration having a length L1 of 16.7 mm, a width L2 of approximately 13 mm, and a height H! of about 15.6 mm. Further examples of such solid forms are also disclosed in design patents such as U.S. Design Pat. No. D453,787 issued Feb. 19, 2002. In use, each such block form "stick", "block", "bar" or "pellet" is fed along a channel in the machine frame into a heated melting device that melts or phase changes the "stick", "block", "bar" or "pellet" directly into a print head reservoir for printing as described above.

Additionally as illustrated in FIG. 5, it is further merely suggested in U.S. Pat. No. 4,636,803 that the solid ink therein can be provided and handled in granular form or as granules that according to the Wentworth-Udden particle sizing scale will have a size of 2 mm to 4 mm. As shown in this patent, a substantially cylindrical housing 532 receives an auger 542 that is rotated by a motor 548. Interstices between the cylindrical housing 532 and a surface of the auger 542 are filled with the solid-state ink in granular form 524. As the auger 542 rotates, the ink 524 in granular form approaches a discharge location 536 and falls through the discharge opening 538 into a trough 540.

Nevertheless, primary difficulties with such solid forms of phase change inks still include undesirable electrostatic charging, clogging, jamming, and a relatively low melt rate. Consequently, conventional phase change ink image producing machines or printers, particularly color image producing such machines or printers, are low throughput machines, typically producing at a rate of less than 30 prints per minute (PPM) and ordinarily cannot approach, let alone exceed 50 prints per minute.

In accordance with the present disclosure, there is provided a particulate composition of solid phase change ink is comprised of sub-granular size pastilles composed of at least a salt, an ink vehicle compound, a viscosity modifying amide compound and a colorant, and each sub-granular size pastille of the particulate composition is at most the size of very coarse sand, and has a diameter of at most 2 mm on the Wentworth-Udden particle-sizing scale for increasing a melting rate thereof at a melting temperature of the solid phase change ink.

BRIEF DESCRIPTION OF THE DRAWINGS

FIG. 8 is a Wentworth-Udden table for particle sizing classifications.

DETAILED DESCRIPTION

Figure 1:
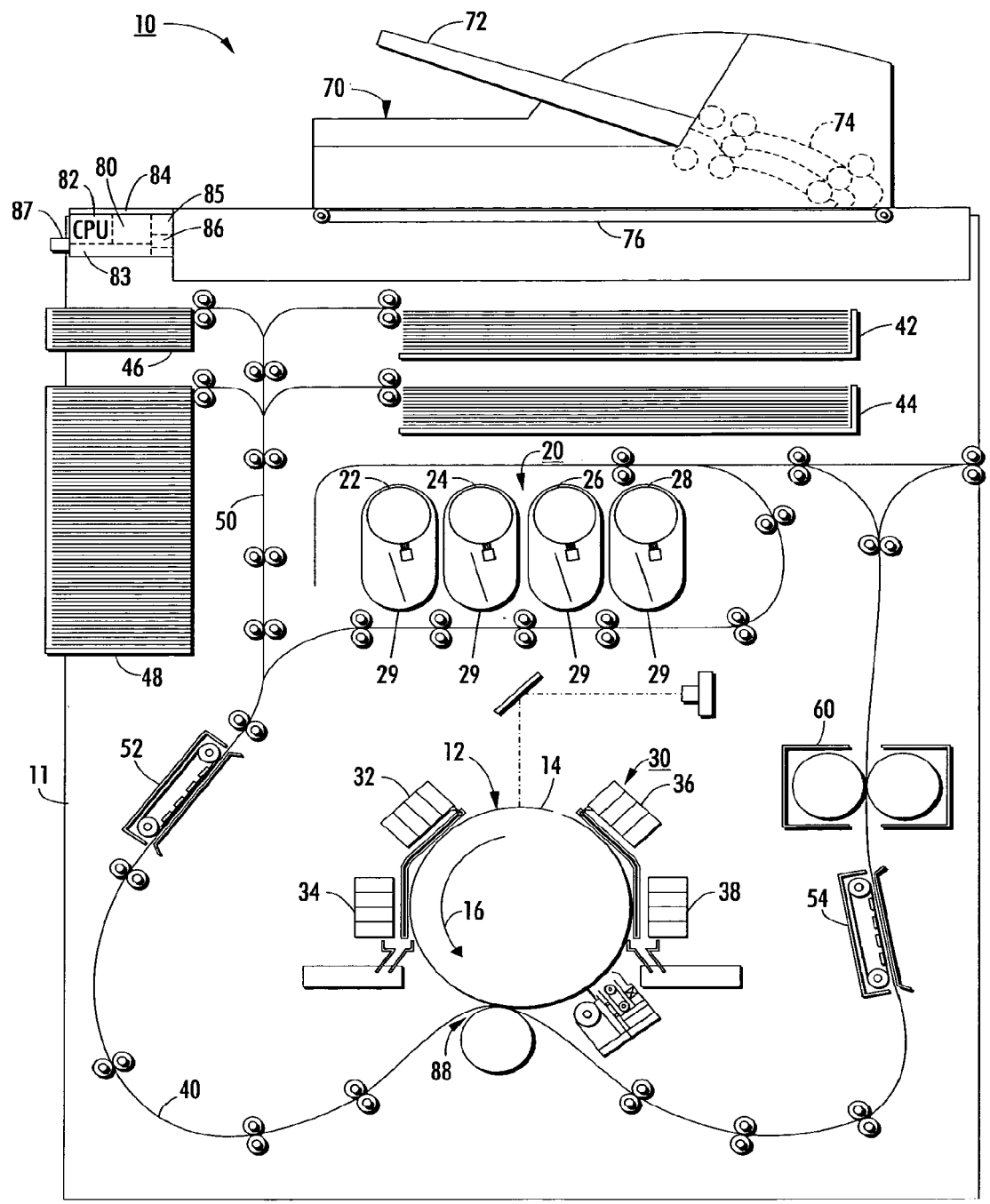
FIG. 1 is a vertical schematic of a high speed exemplary phase change ink image producing machine for using the solid ink pastilles of the present disclosure.

Referring now to FIG. 1, there is illustrated an image producing machine, such as the high-speed phase change ink image producing machine or printer 10 of the present disclosure. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

The high-speed phase change ink image producing machine or printer 10 also includes a phase change ink delivery subsystem 20 that has at least one source 22 of one color phase change ink in solid form, specifically in the granular or pastille form in accordance with the present disclosure. Since the phase change ink image producing machine or printer 10 is a multicolor image producing machine, the ink delivery system 20 includes four (4) sources 22, 24, 26, 28, (to be described in detail below) representing four (4) different colors CYMK (cyan, yellow, magenta, black) of phase change inks. The phase change ink delivery system also includes a melting and control apparatus (not shown) for melting or phase changing the solid form pastilles of the phase change ink into a liquid form. The phase change ink delivery system is suitable for then supplying the liquid form to a printhead system 30 including at least one printhead assembly 32. Since the phase change ink image producing machine or printer 10 is a high-speed, or high throughput, multicolor image producing machine, the printhead system 30 includes multicolor ink printhead assemblies a plural number (e.g. four (4)) of separate printhead assemblies 32, 34, 36 and 38 as shown.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and optionally a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 83, and a display or user interface (UI) 84. The ESS or controller 80 for example includes sensor input and control means 85 as well as a pixel placement and control means 86. In addition the CPU 82 reads, captures, prepares and manages the image data flow between image input sources such as the scanning system 76, or an online or a work station connection 87, and the printhead assemblies 32, 34, 36, 38. As such, the ESS or controller 80 is the main multi-tasking processor for operating and controlling all of the other machine subsystems and functions.

In operation, image data for an image to be produced is sent to the controller 80 from either the scanning system 76 or via the online or work station connection 87 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 88, from the surface 14 onto the receiving substrate for subsequent fusing at fusing device 60.

Figure 2:
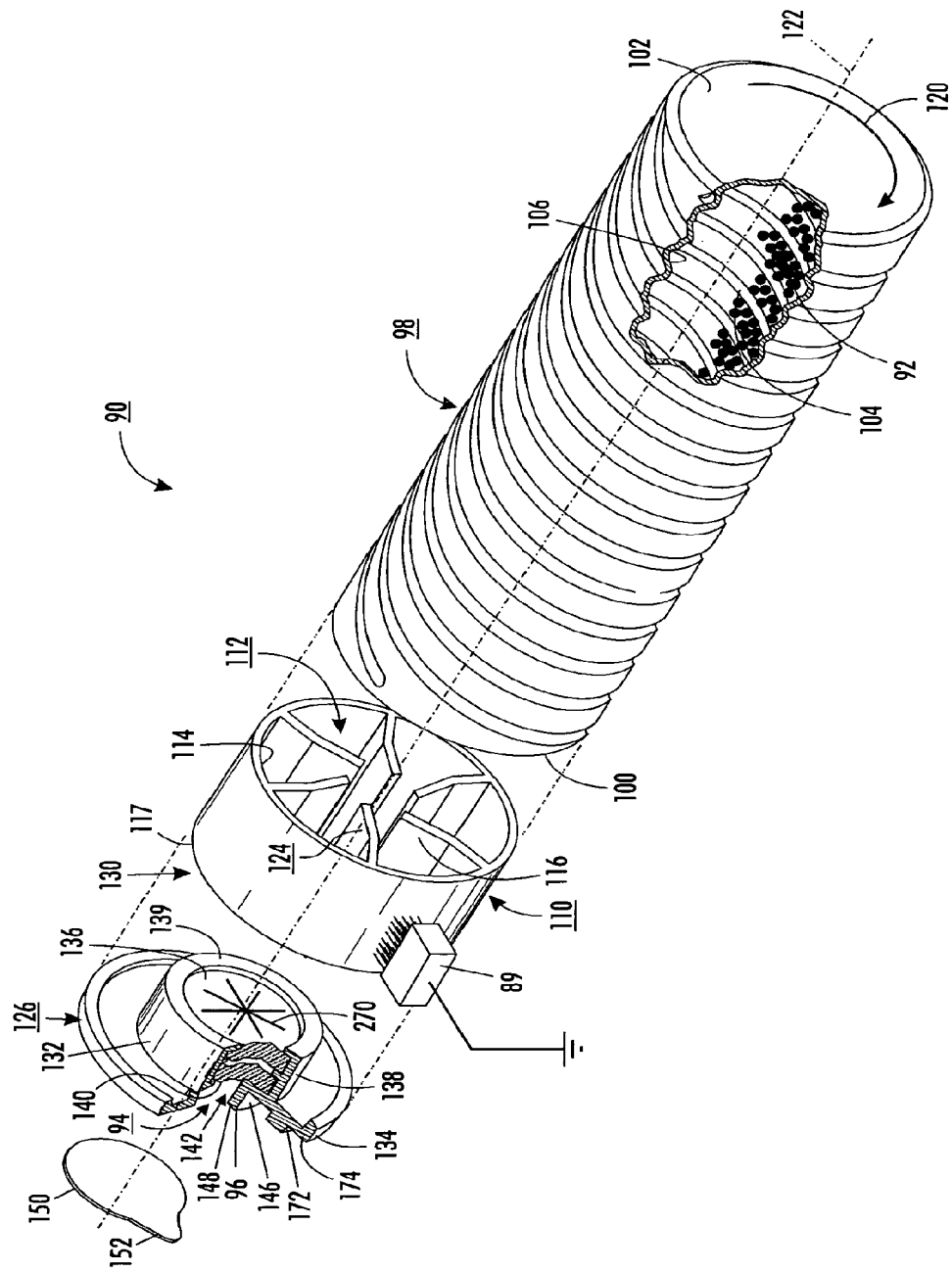
FIG. 2 is an exploded perspective view of a container for holding and dispensing the solid ink pastilles of the present disclosure.

Referring now to FIGS. 1 and 2, some details of the ink delivery system 20 that includes four (4) sources 22, 24, 26, 28 of solid ink pastilles are illustrated in accordance with the present disclosure. As pointed out above the delivery sources 22, 24, 26 and 28 represent four (4) different colors CYMK (cyan, yellow, magenta, black) of phase change inks. As illustrated in FIG. 2, each source 22, 24, 26 and 28 includes a solid ink container 90 that is used to contain and store for supplying, a bulk quantity of waxy solid ink pastilles 92 in accordance with the present disclosure (to be described in detail below).

As illustrated, the solid ink container 90 has a generally cylindrical shape and an opening 94 located on a first end 96 thereof. Preferably, it includes a first generally cylindrically shaped portion 98 having an open end 100 proximate the opening 94, and closed end 102 opposite the open end 100. To urge the solid ink pastilles 92 out of the first generally cylindrical shaped portion 98, the solid ink container 90 preferably includes a spiral rib 104 located on an interior periphery 106 of the cylindrically shaped portion 98. The spiral rib 104 may have either a right hand or a left hand orientation depending on the corresponding rotation of the solid ink container 90 in the machine 10.

The solid ink container 90 also includes a second cylindrical or ring shaped portion 110 that extends from the open end 100 of the first cylindrically shaped portion 98. As shown, the second cylindrical or ring shaped portion 110 includes an interior member 114 that can be an insert, and that has radial protrusions 112 extending inwardly thereof towards the axis or centerline 122. The radial protrusions 112 each have a carrying face 116 that curves in the direction of rotation 120 of the container 90. The radial protrusions 112 thereby form pockets 124 along the carrying face 116 that become filled with a quantity of solid ink pastilles 92 when such pastilles are being moved from the open end 100 of the first cylindrical shape portion 98, and that carry such quantity of the pastilles 92 along the inner periphery of the interior member 114 for feeding out of the container 90.

As further illustrated, the solid ink container 90 includes a plate shaped end portion 126 that extends from a second face 130 of the second cylindrical or ring shaped portion 110. The plate shaped portion 126 includes the first end 96 of the container 90 as well as the opening 94 of the container 90. The plate shaped portion 126 also includes an interior hub 132 that extends inwardly from a disc area 134 of the end portion 126. A puncturable seal 136 is preferably located against an inside face 138 of a lip 139 of the interior hub 132, and is contained within the interior hub 132. The seal 136 serves to contain the solid ink pastilles 92 during installation and removal of the solid ink container 90 from the machine 10.

In order to provide sealing in addition to the puncturable seal 136 when the container 90 is installed into the machine 10, a secondary seal 140 is provided and is located in the interior hub 132 spaced outwardly from, and parallel to, the puncturable seal 136. It should be appreciated that the interior hub 132 may be either a separate component or an integral part of container 90. The secondary seal 140 contains a central opening 142 that slidably fits over an auger tube 144 and seals thereto upon installation into the ink supply source apparatus 29.

Figure 6:
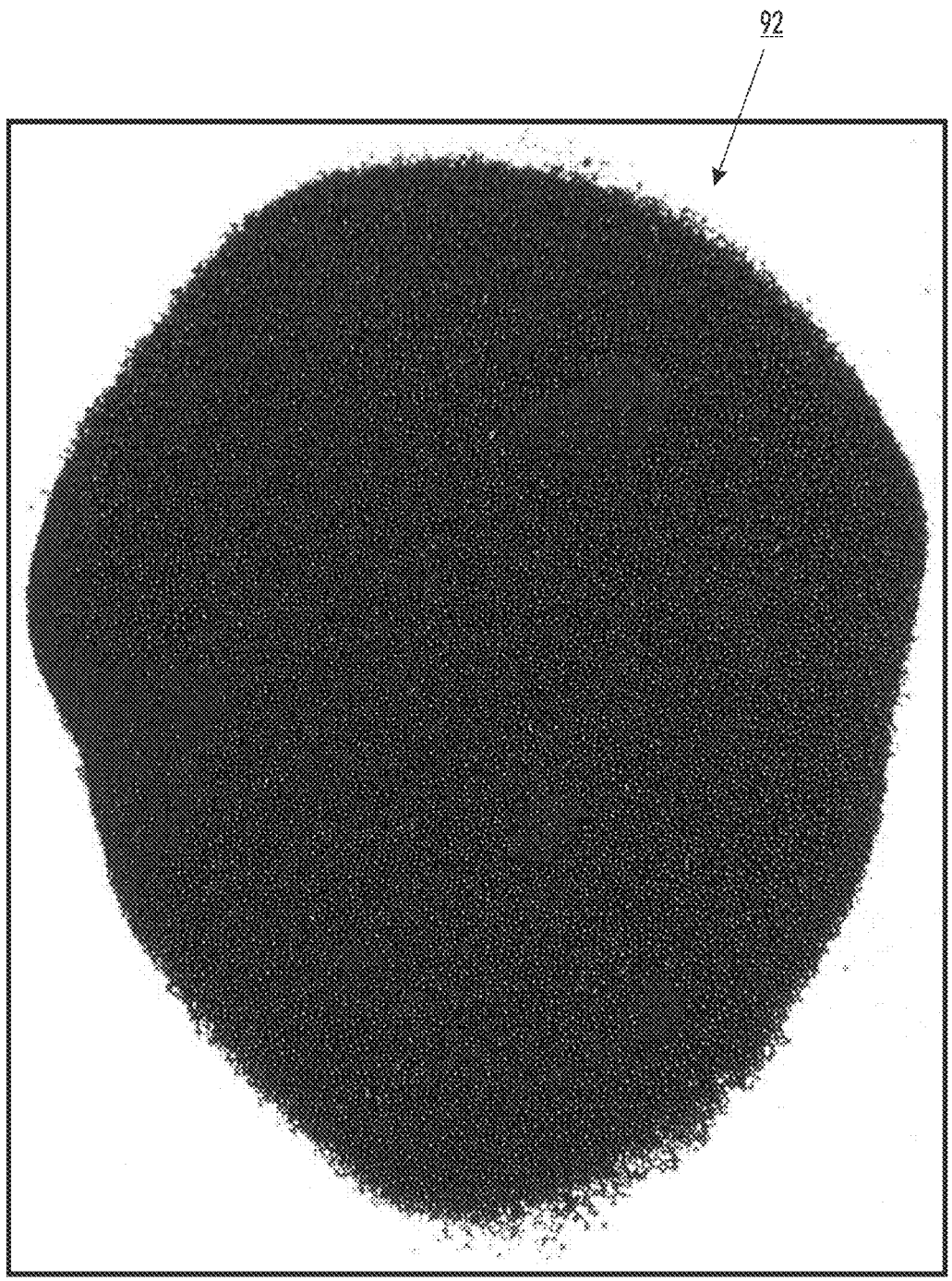
FIGS. 6-7 are each an illustration, in various magnifications, of the solid ink pastilles of the present disclosure.
Figure 7:
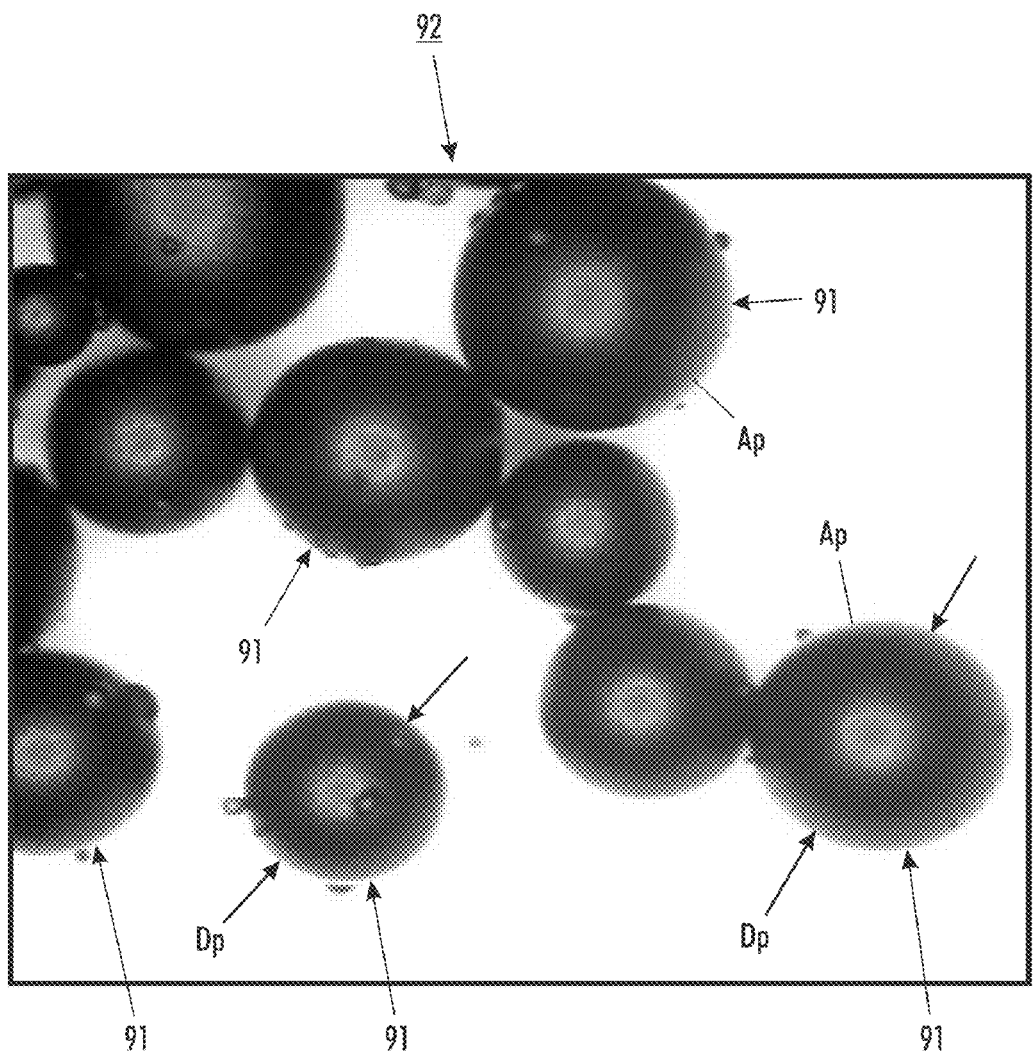

Referring now to FIGS. 6-8, the solid or phase change ink pastilles 92 for example comprise (1) a mixture comprised of a salt and an oxyalkylene compound wherein the conductive mixture possesses a melting point of from about 60.degree. C. to about 120.degree. C.; (2) an ink vehicle compound with a melting point of from about 80.degree. C. to about 100.degree. C.; (3) a viscosity modifying amide compound; (4) a lightfastness component; (5) a lightfastness antioxidant; and (6) a colorant as disclosed in commonly owned U.S. Pat. No. 6,096,125 relevant portions of which are incorporated herein by reference.

Alternatively, the solid or phase change ink pastilles 92 for example may comprise (a) a carbamate or thiourea, said carbamate or thiourea having a melting point of no higher than about 120.degree. C. and an acoustic loss value of no more than about 100 decibels per millimeter, (b) a colorant, (c) a branched hydrocarbon with a number average molecular weight of no more than about 10,000 and a melting point or softening point of no more than about 120.degree. C., (d) an optional plasticizer, (e) an optional alcohol having a melting point of less than about 90.degree. C. and an acoustic loss value of no more than about 100 decibels per millimeter, (f) an optional lightfastness-imparting agent, and (g) an optional antioxidant as further disclosed in commonly owned U.S. Pat. No. 6,319,310 relevant portions of which are also incorporated herein by reference.

Figure 3:
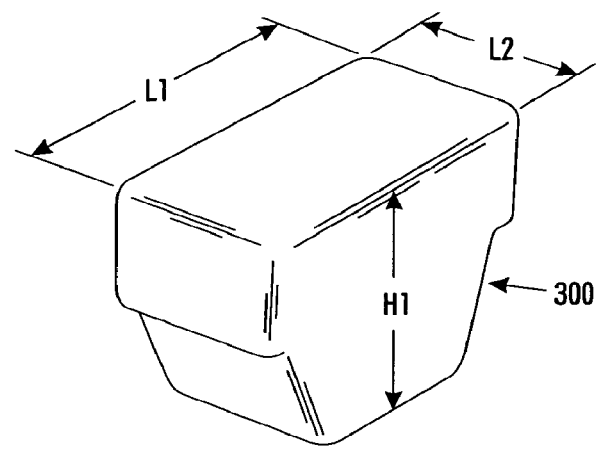
FIGS. 3-5 are each an illustration of a prior art solid ink form for use in low phase change ink imaging machines.
Figure 4:
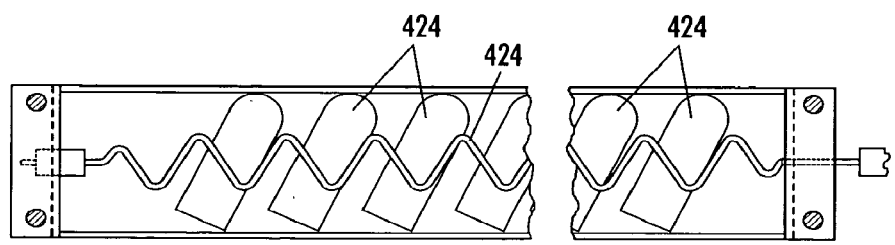
Figure 5:
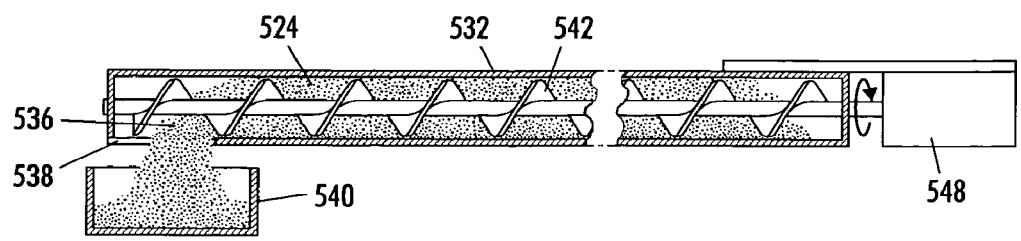

Referring now to FIGS. 3-5, and as disclosed above, conventionally, the solid form of such solid or phase change inks is a "stick", "block", "bar" or "pellet" as disclosed for example in U.S. Pat. No. 4,636,803 as illustrated in FIG. 4 as a bullet shaped or cylindrical pellet 424 that is engaged at its rear side by a turn in a helix 442. In U.S. Pat. No. 4,739,339 the solid ink is shown as a cylindrical block; in U.S. Pat. No. 5,038,157 as a hexagonal bar; and in U.S. Pat. No. 6,053,608, as illustrated in FIG. 3, it is shown as a tapered block 300 with a stepped configuration having a length L1 of 16.7 mm, a width L2 of approximately 13 mm, and a height H! of about 15.6 mm. Further examples of such solid forms are also disclosed in design patents such as U.S. Design Pat. No. D453,787 issued Feb. 19, 2002. In use, each such block form "stick", "block", "bar" or "pellet" is fed along a channel in the machine frame into a heated melting device that melts or phase changes the "stick", "block", "bar" or "pellet" directly into a print head reservoir for printing as described above.

Additionally as illustrated in FIG. 5, it is further merely suggested in U.S. Pat. No. 4,636,803 that the solid ink therein can be provided and handled in granular form or as granules. As shown therein, a substantially cylindrical housing 532 receives an auger 542 that is rotated by a motor 548. Interstices between the cylindrical housing 532 and a surface of the auger 542 are filled with the solid-state ink in granular form 524. As the auger 542 rotates, the ink 524 in granular form approaches a discharge location 536 and falls through the discharge opening 538 into a trough 540. Nevertheless, primary difficulties with such solid forms of phase change inks still include undesirable electrostatic charging, clogging, jamming, and a relatively low melt rate.

In contrast to such conventional forms of solid inks, the solid ink in accordance with the present disclosure is a particulate composition that is comprised of sub-granular size pastilles composed of at least a salt, an ink vehicle compound, a viscosity modifying amide compound and a colorant, and each sub-granular size pastille of the particulate composition is at most the size of very coarse sand, and has a diameter of at most 2 mm on the Wentworth-Udden particle-sizing scale for increasing a melting rate thereof at a melting temperature of the solid phase change ink. As disclosed and incorporated by reference above, the particulate composition of solid phase change ink in accordance with the present disclosure may further comprise (a) a mixture of the salt and an oxyalkylene compound having a melting point of from about 60.degree. C. to about 120.degree. C.; (b) a lightfastness component; and (c) a lightfastness antioxidant.

Such a particle size can be achieved by turning the solid ink into particulate form using for example an atomizing spray process, a pastillation process, or prilling tower process. Examples of pastillization apparatus and processes are disclosed in U.S. Pat. No. 5,378,132, issued Jan. 3, 1995 and entitled "Apparatus for producing pastilles from flowable material" discloses in a device for producing granules or tablets from fluid materials, that the material is fed to the press-slot between a rotative hollow cylinder with an inner toothing and a press-cylinder with an outer toothing that engages the inner toothing. Bores extend from the bottom of the teeth of the inner toothing of the hollow cylinder up to its outer side. The material is pressed through these bores when the hollow cylinder engages the press-cylinder and is laid as tablets or granules on a cooling surface. At least one part of the outer circumference of the hollow cylinder remote from the cooling surface is surrounded by a heating shell. Outside the heating shell and spaced apart from it is arranged another shell in such a way that, between the heating shell and the other shell, a waste gas shaft is formed in communication with a suction nozzle for withdrawing the gases that emanate from the deposited material as it cools.

U.S. Pat. No. 5,013,498 issued May 7, 1991 and entitled "Method and apparatus for producing pastilles" discloses that pastilles are formed by passing small quantities of a viscous material through small openings and onto a moving conveyor surface located therebeneath. The viscous material is contacted by the conveyor surface after the material protrudes from the openings, but before the material becomes sufficiently large to break free and fall. Instead, the conveyor surface forcefully extracts the material from the openings, thereby resulting in the formation of pastilles which are of smaller size than would have been the case had the material been allowed to break free and fall on its own accord.

U.S. Pat. No. 5,633,005 issued May 27, 1997 and entitled "Dimeticon pastilles" discloses a type of pastilles that are made from completely or partly water-soluble, natural and/or synthetic polymers selected from the group comprising gums, alginates, carrageen, starch, pectin and gelatin and containing polydimethylsiloxanes (dimeticon, simethicone). The invention also concerns a method of producing such pastilles.

Another example, a Disc Pastillator, or pelletizing disc by manufacturer GMF-Gouda of Waddinxveen, Holland, can be used to pastillize or create pastilles from a molten form of the above solid ink compositions. Similarly, a Jet Priller by GMF-Gouda can be used in a prilling tower process to produce prills from a molten form of the above solid ink compositions.

Pastillizing as above is a process whereby a molten, congealable liquid product is congealed into small regular particles or pastilles. During the pastillizing process, the molten, congealable liquid product is dosed for example by the GMF Gouda disc pasillator via a stationary dosing head as controlled size droplets or pastilles onto an intermittent rotating disc. The moment that such controlled size droplet hits the disc it starts to congeal. The process of dosing, congealing and pastillizing is completed in less than one rotation. The result is easily transportable particles, pastilles that are substantially uniform in shape and quality.

As illustrated in FIGS. 6-7, the pastille or prill shape or form of the solid ink in accordance with the present disclosure is particulate, that means, numerous pastille or prill particles 91 thereof form a larger bulk quantity 92 (see also FIG. 2) thereof for handling and treatment. Each pastille or granule 91 formed as such advantageously has a special solid shape that includes a particle size diameter Dp of at most 2 mm as stated above, and a relatively small surface area Ap of which at least 75% is substantially spherical for increasing the bulk flow rate of the particulate composition. Accordingly, and for the same reasons only at most 25% of the small surface area Ap will or should be substantially flat. It has been found that with the pastille particle size at less than or equal to 2 mm desirably, melting rates of 10 gm/min to 15 gm/min are achievable with power at 85 watts. In one embodiment, the melting rate per pastille is at most 3 seconds per pastille, which was found to amount overall to a rate of at least 10 gm/min by weight of pastilles.

In another embodiment, the particulate composition of solid phase change ink comprises sub-granular size pastilles composed of at least (a) a carbamate or thiourea, having a melting point of no higher than about 120.degree. C. and an acoustic loss value of no more than about 100 decibels per millimeter, (b) a colorant; (c) an optional plasticizer, (d) an optional alcohol having a melting point of less than about 90.degree. C. and an acoustic loss value of no more than about 100 decibels per millimeter, (e) an optional lightfastness-imparting agent, and (f) an optional antioxidant, and each sub-granular size pastille of the particulate composition is at most the size of very coarse sand and has a diameter of at most 2 mm on the Wentworth-Udden particle-sizing scale for increasing a melting rate thereof at a melting temperature of the solid phase change ink.

In accordance with another aspect of the present disclosure, the particulate composition of solid phase change ink 92 comprises sub-granular size pastilles composed of at least a salt, an ink vehicle compound, a viscosity modifying amide compound and a colorant, and each sub-granular size pastille of the particulate composition is the size of one of very fine sand, fine sand, medium sand and coarse sand having a diameter of less than 1 mm on the Wentworth-Udden particle-sizing scale for increasing a melting rate thereof at a melting temperature of the solid phase change ink.

In accordance with the present aspect, each sub-granular size pastille of the particulate composition for example is the size of very fine sand having a diameter within a range of 0.0625-0.125 mm on the Wentworth-Udden particle-sizing scale for increasing a melting rate thereof at a melting temperature of the solid phase change ink. Accordingly too, each sub-granular size pastille of the particulate composition for example is the size of fine sand having a diameter within a range of 0.125-0.250 mm on the Wentworth-Udden particle-sizing scale for increasing a melting rate thereof at a melting temperature of the solid phase change ink. Further, each sub-granular size pastille of the particulate composition for example is the size of medium sand having a diameter within a range of 0.250-0.500 mm on the Wentworth-Udden particle-sizing scale for increasing a melting rate thereof at a melting temperature of the solid phase change ink. Finally, each sub-granular size pastille of the particulate composition for example is the size of coarse sand having a diameter within a range of 0.500-1.00 mm on the Wentworth-Udden particle-sizing scale for increasing a melting rate thereof at a melting temperature of the solid phase change ink.

In each case, the particulate composition of solid phase change ink may further comprise (a) a mixture of the salt and an oxyalkylene compound having a melting point of from about 60.degree. C. to about 120.degree. C.; (b) a lightfastness component; and (c) a lightfastness antioxidant. A pellet of a diameter of 1 mm or less allows for a minimized surface area that can be melted very quickly to meet the high flow rate required for a high volume printer at 50 prints per minute and more.

Melting the waxy particulate pastilles at minimum melt rate of about 10 gm/min was found to be sufficient to maintain a printed sheet area coverage of 40% at a machine throughput rate of 50 prints per minute. It was also found that the particular size of pastilles 91 in accordance to the present disclosure led to the use of a minimum amount of power to melt, and in addition allowed the use of heaters such as a folded fin PTC heater that have small heat transfer cells.

As can be seen, there has been provided a particulate composition of solid phase change ink is comprised of sub-granular size pastilles composed of at least a salt, an ink vehicle compound, a viscosity modifying amide compound and a colorant, and each sub-granular size pastille of the particulate composition is at most the size of very coarse sand, and has a diameter of at most 2 mm on the Wentworth-Udden particle-sizing scale for increasing a melting rate thereof at a melting temperature of the solid phase change ink.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A particulate composition of solid phase change ink comprising:
   a. sub-granular size pastilles composed of at least a salt, an ink vehicle compound,
   b. a viscosity modifying amide compound, and
   c. a colorant,
   d. each sub-granular size pastille of said particulate composition being sized to have a diameter of at most 2 mm on the Wentworth-Udden particle-sizing scale and each sub-granular size pastille of said particulate composition includes a flattened portion and a spherical portion, the flattened portion not exceeding twenty-five percent of a surface area of the sub-granular size pastille to enable a melt rate of approximately 10 gm/minute of the sub-granular size pastilles by a melting apparatus within a solid ink jet printer that supplies melted ink to a printhead in the solid ink printer.

2. The particulate composition of claim 1, wherein the pastilles of said particulate composition have a sufficient melt rate to maintain a printed sheet area coverage of at least 40% at a machine throughput rate of at least 50 sheets per minute.

3. The particulate composition of claim 1, wherein the melt rate is obtainable with less than about 85 watts power input.

* * * * *